United States Patent
Kenney et al.

(10) Patent No.: US 9,344,179 B2
(45) Date of Patent: *May 17, 2016

(54) METHODS AND ARRANGEMENTS FOR COMMUNICATIONS IN LOW POWER WIRELESS NETWORKS

(75) Inventors: Thomas J. Kenney, Portland, OR (US); Eldad Perahia, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/977,707

(22) PCT Filed: Dec. 31, 2011

(86) PCT No.: PCT/US2011/068262
§ 371 (c)(1),
(2), (4) Date: Jun. 29, 2013

(87) PCT Pub. No.: WO2013/052079
PCT Pub. Date: Apr. 11, 2013

(65) Prior Publication Data
US 2015/0010098 A1    Jan. 8, 2015

Related U.S. Application Data

(60) Provisional application No. 61/544,775, filed on Oct. 7, 2011.

(51) Int. Cl.
*H04L 27/28* (2006.01)
*H04B 7/06* (2006.01)
(Continued)

(52) U.S. Cl.
CPC ............. *H04B 7/0697* (2013.01); *H04L 1/00* (2013.01); *H04L 5/0023* (2013.01);
(Continued)

(58) Field of Classification Search
CPC . H04L 5/0007; H04L 5/0048; H04L 27/2601; H04L 27/2602
USPC ......................................................... 375/267
See application file for complete search history.

(56) References Cited

U.S. PATENT DOCUMENTS 8,625,690 B2   1/2014  Taghavi Nasrabadi et al.
8,743,717 B2*  6/2014  Li et al. .................... 370/252
(Continued)

FOREIGN PATENT DOCUMENTS

RU    2340104    11/2008
RU    2377727    12/2009
(Continued)

OTHER PUBLICATIONS

Office Action for Russian Patent Application No. 2014117526, mailed on May 25, 2015, 8 pages, including 3 pages of English translation.
(Continued)

*Primary Examiner* — David S Huang
(74) *Attorney, Agent, or Firm* — Shichrur & Co.

(57) ABSTRACT

Embodiments may comprise an orthogonal frequency division multiplexing (OFDM) system operating in the 1 GHz and lower frequency bands. In many embodiments, the physical layer logic may implement orthogonal frequency division multiplexing symbols encoded with 32 sub-carriers such as twenty data sub-carriers, four pilot sub-carriers, seven guard sub-carriers, and one direct current (DC) sub-carrier. Many embodiments may transform the orthogonal frequency division multiplexing symbols between frequency and time domains with a 32-point, fast Fourier transform or inverse fast Fourier transform. Some embodiments may up-convert and transmit a communication signal with the orthogonal frequency division multiplexing symbols at one megahertz. Further embodiments may receive and detect communications signal with the orthogonal frequency division multiplexing symbols at one megahertz.

18 Claims, 8 Drawing Sheets

(51) Int. Cl.
*H04L 1/00* (2006.01)
*H04L 5/00* (2006.01)
*H04L 27/00* (2006.01)
*H04L 27/26* (2006.01)
*H04L 27/12* (2006.01)

(52) U.S. Cl.
CPC ........... *H04L 5/0044* (2013.01); *H04L 5/0048* (2013.01); *H04L 5/0064* (2013.01); *H04L 27/0008* (2013.01); *H04L 27/12* (2013.01); *H04L 27/2602* (2013.01); *H04L 27/2628* (2013.01)

(56) References Cited

U.S. PATENT DOCUMENTS

| | | | |
|---|---|---|---|
| 2007/0147523 A1* | 6/2007 | Sakata et al. | 375/260 |
| 2008/0095103 A1* | 4/2008 | Goodjohn | 370/329 |
| 2009/0122771 A1 | 5/2009 | Cai | |
| 2009/0143030 A1 | 6/2009 | Hammerschmidt et al. | |
| 2010/0111014 A1 | 5/2010 | Kang et al. | |
| 2010/0203828 A1 | 8/2010 | Zheng | |
| 2011/0222504 A1 | 9/2011 | Ma et al. | |
| 2011/0274211 A1* | 11/2011 | Ko et al. | 375/300 |
| 2011/0317779 A1 | 12/2011 | Schmidl et al. | |
| 2013/0215993 A1* | 8/2013 | Taghavi Nasrabadi et al. | 375/295 |

FOREIGN PATENT DOCUMENTS

| | | |
|---|---|---|
| WO | 2009041793 | 4/2009 |
| WO | 2012122119 | 9/2012 |
| WO | 2013036642 | 3/2013 |

OTHER PUBLICATIONS

International Search Report and Written Opinion for PCT Patent Application No. PCT/US2011/068262, mailed on Oct. 30, 2012, 10 pages.

International Preliminary Report on Patentability and Written Opinion for PCT Patent Application No. PCT/US2011/068262, mailed on Apr. 17, 2014, 6 pages.

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications, 1232 pages.

Office Action for U.S. Appl. No. 14/558,778, mailed on Mar. 6, 2015, 17 pages.

European Search Report for European Patent Application No. 11873740.2, mailed on Apr. 29, 2015, 8 pages.

Office Action for Australian Patent Application No. 2011378436, mailed on Jun. 25, 2015, 3 pages.

Notice of Allowance for Russian Patent Application No. 2014117526, mailed on Sep. 2, 2015, 10 pages.

* cited by examiner

| 1 MHZ BANDWIDTH INTERLEAVING TABLE 24 DATA TONES, 5 GUARD TONES, 2 PILOT TONES AND 1 DC TONE | | | | 252 |
|---|---|---|---|---|
| $N_{ROWS}$ | $N_{COLUMNS}$ | | $N_{ROWS}$ | $N_{COLUMNS}$ |
| 1 * Nbpscs | 2 | | 1 * Nbpscs | 4 |
| 2 * Nbpscs | 2 | | 2 * Nbpscs | 4 |
| 3 * Nbpscs | 2 | | 3 * Nbpscs | 4 |
| 4 * Nbpscs | 2 | | 6 * Nbpscs | 4 |
| 6 * Nbpscs | 3 | | 1 * Nbpscs | 6 |
| 1 * Nbpscs | 3 | | 2 * Nbpscs | 6 |
| 2 * Nbpscs | 3 | | 4 * Nbpscs | 6 |
| 4 * Nbpscs | 3 | | 1 * Nbpscs | 8 |
| 8 * Nbpscs | 3 | | 3 * Nbpscs | 8 |

METHODS AND ARRANGEMENTS FOR COMMUNICATIONS IN LOW POWER WIRELESS NETWORKS

CROSS-REFERENCE

This Application is a National Phase Application of PCT International Application No. PCT/US2011/068262, International Filing Date Dec. 31, 2011, which claims the benefit of and priority from U.S. Provisional Patent application 61/544,775, filed Oct. 7, 2011, the entire disclosures of which are incorporated herein by reference.

BACKGROUND

Embodiments are in the field of wireless communications. More particularly, embodiments are in the field of communications protocols between wireless transmitters and receivers.

DETAILED DESCRIPTION OF EMBODIMENTS

Figure 1:
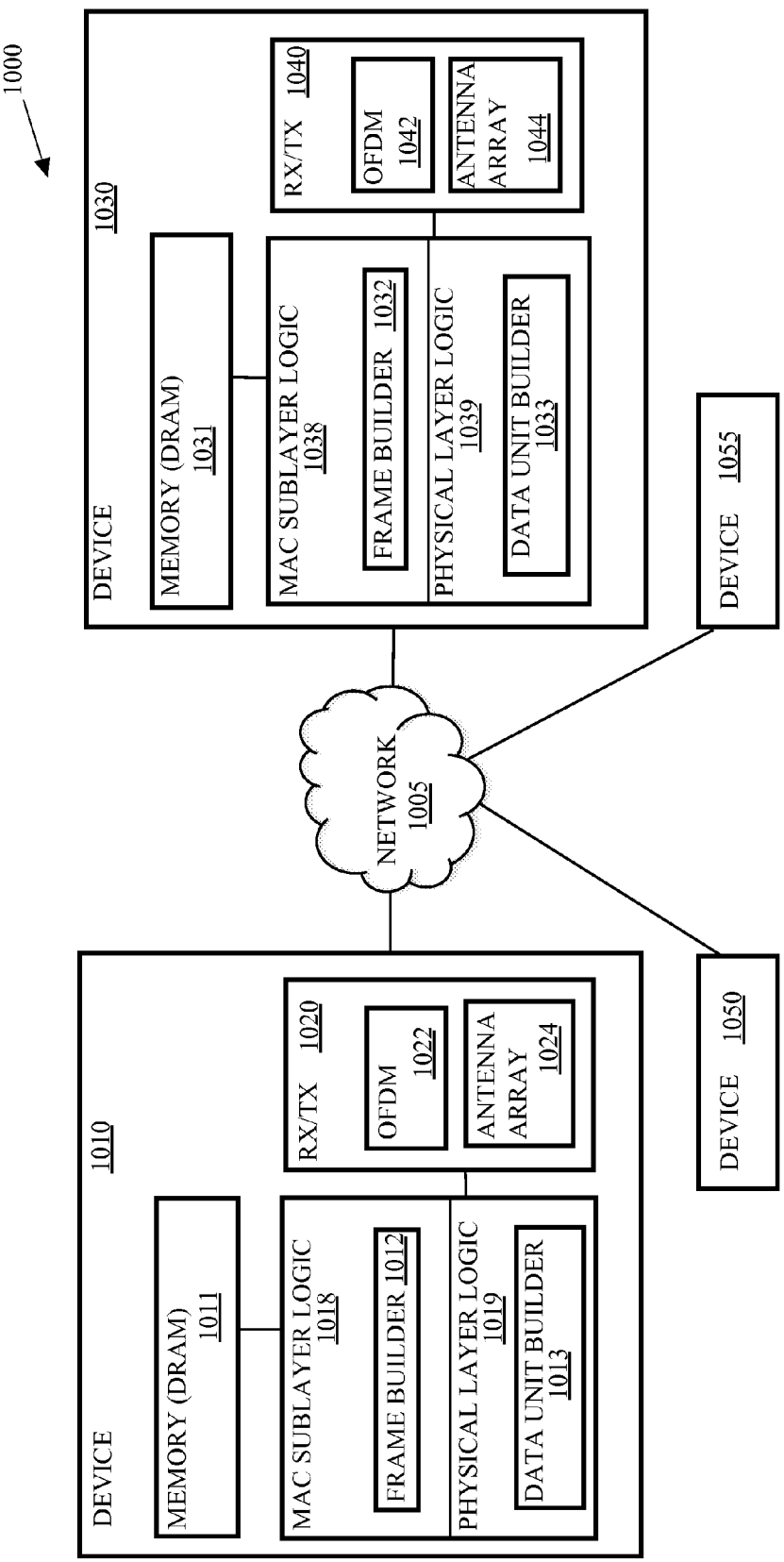
FIG. 1 depicts an embodiment of an example wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may comprise an orthogonal frequency division multiplexing (OFDM) system operating in the 1 GHz and lower frequency bands. In the frequency bands of 1 GHz and lower, the available bandwidth is restricted, thus an IEEE 802.11n/ac type system that uses bandwidths of 20, 40, 80 and 160 MHz may not be practicable in some geographic regions. In many embodiments, the systems have bandwidths on the order of approximately 1 to 10 MHz. In several embodiments, an 802.11n/ac type system may be down-clocked to achieve lower bandwidths. For instance, many embodiments are down-clocked by N, such as 20, 40, 80 and 160 MHz divided by N, where N could take on a value of, e.g., 10, providing 2, 4, 8, and 16 MHz bandwidth operation. Embodiments may also implement a 1 MHz bandwidth by another method. In some embodiments, the tone counts for 2, 4, 8, and 16 MHz bandwidths may be based on those of IEEE 802.11ac systems. In other embodiments, the tone counts may be different from those IEEE 802.11ac systems, removing, for example, tone counts that are not unnecessary at the lower bandwidths.

In many embodiments, the physical layer logic may implement particular tone counts for 1 MHz operation. For instance, in 1 MHz operation, the orthogonal frequency division multiplexing symbols may comprise twenty data sub-carriers (tones), four pilot sub-carriers, seven guard sub-carriers, and one direct current (DC) sub-carrier. In other embodiments, the orthogonal frequency division multiplexing symbols may comprise twenty-four data sub-carriers (tones), two pilot sub-carriers, five guard sub-carriers, and one direct current (DC) sub-carrier. In other embodiments, the orthogonal frequency division multiplexing symbols may comprise twenty-two data sub-carriers (tones), four pilot sub-carriers, five guard sub-carriers, and one direct current (DC) sub-carrier. In still other embodiments, the orthogonal frequency division multiplexing symbols may comprise twenty-two data sub-carriers (tones), two pilot sub-carriers, seven guard sub-carriers, and one direct current (DC) sub-carrier.

Such embodiments may transform the orthogonal frequency division multiplexing symbols between frequency and time domains with a 32-point, fast Fourier transform or inverse fast Fourier transform. Some embodiments may up-convert and transmit a communication signal with the orthogonal frequency division multiplexing symbols at one megahertz. Further embodiments may receive and detect communications signal with the orthogonal frequency division multiplexing symbols at one megahertz.

Some embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Some embodiments reuse the IEEE 802.11n/ac system with new features that meet these lower data rate and ultra low power consumption requirements to reuse hardware implementations and to reduce implementation costs. Further embodiments accommodate multiple streams. Several embodiments do not implement legacy training fields and legacy signatures and do not implement multi-user, Multiple Input, Multiple Output (MIMO). And some embodiments employ beamforming.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, 1050, and 1055 via the network 1005. The communications devices 1010, 1030, 1050, and 1055 may comprise sensors, stations, access points, hubs, switches, routers, computers, laptops, notebooks, cellular phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. Periodically, the communications device 1030 may initiate communications with the metering substation to transmit data related to water usage on a one MHz bandwidth channel. The communications device 1030 may encode symbols with twenty data subcarriers, four pilot sub-carriers, seven guard sub-carriers, and one direct current sub-carrier and transform the symbols from the frequency domain to the time domain to create a communications signal. Furthermore, the metering station or other communications device may periodically initiate communications with the communications device 1030 on a one MHz bandwidth channel, interleaving the symbols with five columns by 4 times Nbpscs (N bits per single coded symbol) to, e.g., update firmware of the communications device 1030. In other embodiments, the communications device 1030 may only respond to communications and may not comprise logic that initiates communications.

In other embodiments, the communications device 1030 may encode symbols with twenty-four data sub-carriers (tones), two pilot sub-carriers, five guard sub-carriers, and one direct current (DC) sub-carrier and transform the symbols from the frequency domain to the time domain to create a communications signal. In other embodiments, the communications device 1030 may encode symbols with twenty-two data sub-carriers (tones), four pilot sub-carriers, five guard sub-carriers, and one direct current (DC) sub-carrier, and one direct current (DC) sub-carrier and transform the symbols from the frequency domain to the time domain to create a communications signal. In still other embodiments, the communications device 1030 may encode symbols with twenty-two data sub-carriers (tones), two pilot sub-carriers, seven guard sub-carriers, and one direct current (DC) sub-carrier, and one direct current (DC) sub-carrier and transform the symbols from the frequency domain to the time domain to create a communications signal.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and Media Access Control (MAC) sublayer logic 1018 and 1038, respectively. The memory 1011, 1031 such as Dynamic Random Access Memory (DRAM) may store the frames, preambles, and preamble structures, or portions thereof. The frames, also referred to as MAC layer Protocol Data Units (MPDUs), and the preamble structures may establish and maintain synchronized communications between the transmitting device and the receiving device.

The MAC sublayer logic 1018, 1038 may generate the frames and the physical layer logic 1019, 1039 may generate physical layer data units (PPDUs). More specifically, the frame builders 1012 and 1032 may generate frames and the data unit builders 1013 and 1033 may generate PPDUs. The data unit builders 1013 and 1033 may generate PPDUs by encapsulating payloads comprising the frames generated by frame builders 1012 and 1032 to prefix the payloads to be transmitted over one or more RF channels via antenna arrays 1024 and 1044, respectively.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier and encoded with the sub-carriers by which the OFDM symbols will be transmitted to a receiving device such as twenty data sub-carriers, seven guard sub-carriers, four pilot sub-carriers, and one DC subcarrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

Each transceiver 1020, 1040 comprises an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission. For a 1 MHz bandwidth, in some embodiments, the OFDM symbols may comprise 20 data tones, seven guard tones, four pilot tones, and one DC tone. In further embodiments, the OFDM symbols may comprise 24 data tones, two pilot tones, five guard tones, and one DC tone; 22 data tones, four pilot tones, five guard tones, and one DC tone; or 22 data tones, two pilot tones, seven guard tones, and one DC tone.

Figures 1A, 2A:
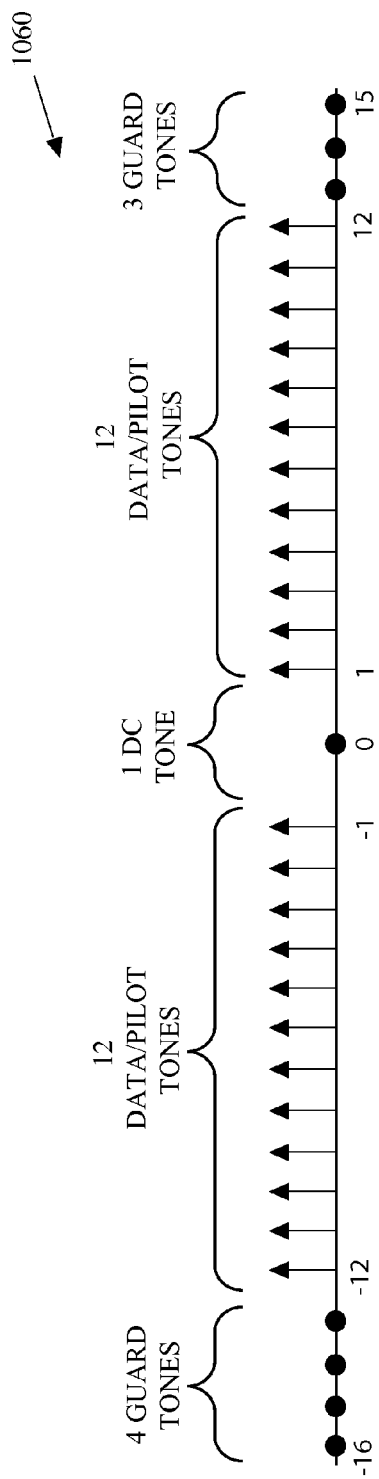
FIGS. 1A-D depicts alternative embodiments of an OFDM symbol for 1 MHz operation of the transceivers in FIG. 1.
FIGS. 2A-D depicts alternative embodiments of a table with parameters for rows and columns for interleaving data in 1 MHz operation of the transceiver in FIG. 2.

FIG. 1A illustrates an embodiment of an OFDM symbol 1060. The OFDM module 1022 may generate different OFDM symbols for different bandwidths such a 2 MHz, 4 MHz, 8 MHz, and 16 MHz and may generate the OFDM symbol 1060 for a 1 MHz bandwidth channel, for transceivers such as the transceivers of FIG. 1, corresponding to a 32-point, inverse Fourier transform. The OFDM symbol 1060 comprises 32 tones, also referred to as sub-carriers, indexed from −16 to 15. The 32 tones include 20 data tones, seven guard tones, four pilot tones, and one direct current (DC) tone. The four lowest frequency tones are guard tones provided for filter ramp up and filter ramp down. The index zero frequency tone is the DC tone and is provided for mitigating radio frequency interference. The DC tone may comprise a tone at the carrier frequency, e.g., 1 MHz. And the data and pilot frequency tones are provided between indices −12 through −1 and indices 1 through 12.

Figures 1B, 2B:
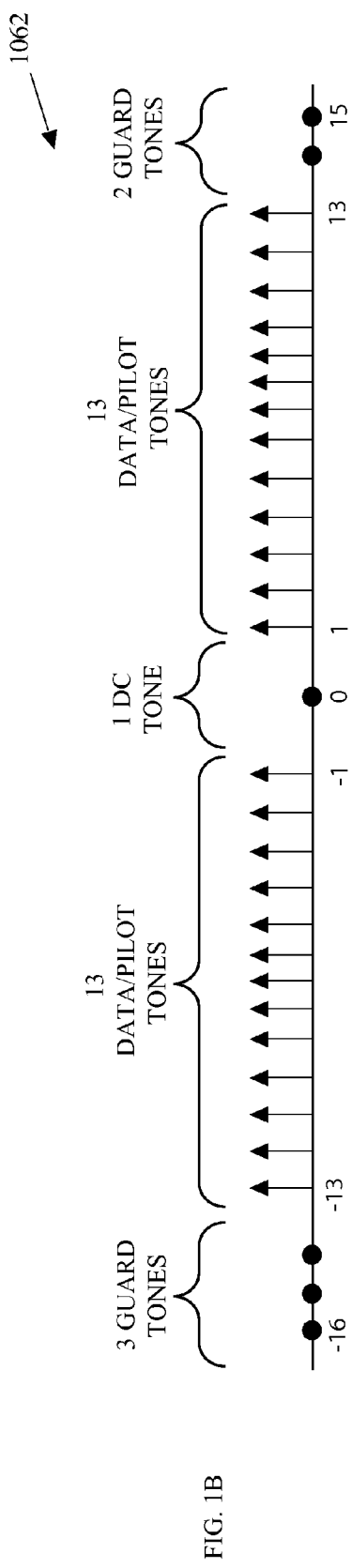
Figures 1C, 2C:
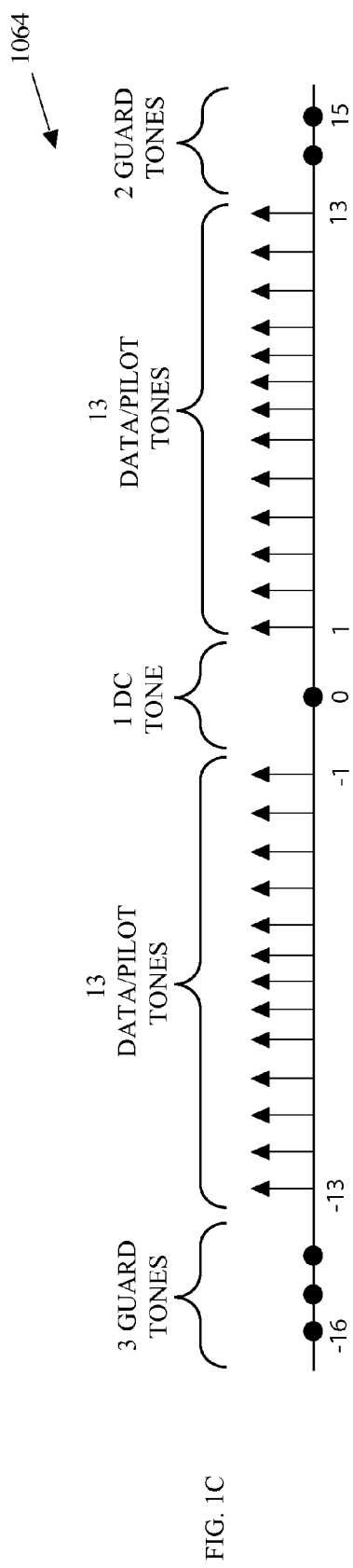
Figures 1D, 2D:
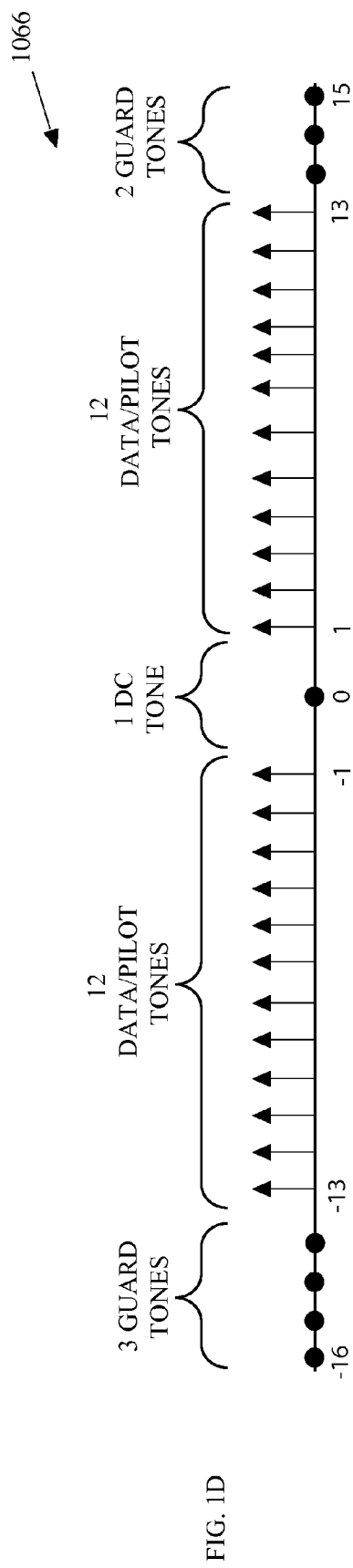

The RF receiver comprises an OFDM module 1042, which receives electromagnetic energy at an RF frequency and extracts the digital data therefrom. For 1 MHZ operation, OFDM 1042 may extract OFDM symbols comprising 20 data tones, seven guard tones, and one DC tone such as the OFDM symbol 1060 illustrated in FIG. 1A. In other embodiments, the OFDM symbols may be encoded as OFDM symbol 1062, 1064, or 1066 as illustrated in FIGS. 1B-D, respectively, with the interleaver configurations described in tables 252, 254, or 256, respectively.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. The wireless communication system 1000 of FIG. 1 is intended to represent an Institute for Electrical and Electronics Engineers (IEEE) 802.11ah system. Similarly, devices 1010, 1030, 1050, and 1055 are intended to represent IEEE 802.11ah devices.

The OFDM module 1022, 1032 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and is capable of communicating with IEEE 802.11ah devices.

Figure 2:
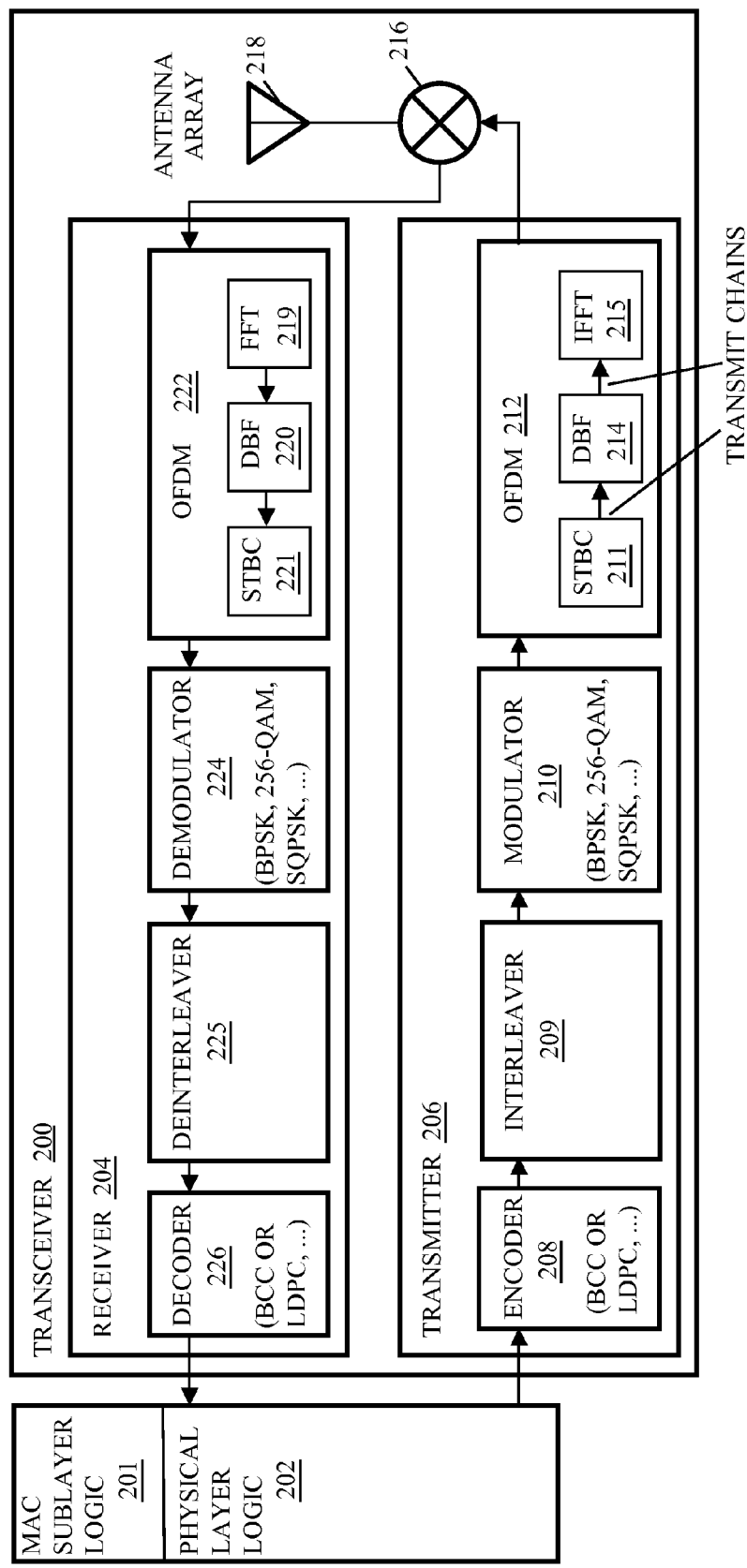
FIG. 2 depicts an embodiment of an apparatus to generate and transmit an Orthogonal Frequency Division Multiplexing (OFDM)-based communication in a wireless network.

FIG. 2 illustrates an embodiment of an apparatus to transmit an orthogonal frequency division multiplexing (OFDM)-based communication in a wireless network. The apparatus comprises a transceiver 200 coupled with Medium Access Control (MAC) sublayer logic 201 and physical layer logic 202. The MAC sublayer logic 201 may generate a frame and the physical layer logic 202 may encapsulate the frame (MPDU) with a preamble to generate a physical layer protocol data unit (PPDU) to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

The transceiver 200 comprises a receiver 204 and a transmitter 206. The transmitter 206 may comprise one or more of an encoder 208, an interleaver 209, a modulator 210, and an OFDM module 212. The encoder 208 of transmitter 206 receives data destined for transmission from the physical layer logic 202. The physical layer logic 202 may present data to transceiver 200 in blocks or symbols such as bytes of data. The encoder 208 may encode the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

In the present embodiment, the encoder 208 may implement a binary convolutional coding (BCC) or a low-density parity check coding (LDPC), as well as other encodings. The output of encoder 210 is fed to an interleaver 209 as data streams. In some embodiments, a stream parser may reside between the encoder 208 and the interleaver 209 to parse the data into multiple data streams.

The interleaver 209 may interleave bits of the data stream, often referred to at this stage as spatial streams to prevent long sequences of adjacent noisy bits from entering a decoder at the receiver. The interleaver 209 may interleave the bits of data in the data stream by storing the data in rows of memory such as a buffer, a cache, or other memory. The interleaver 209 then outputs columns of the data. The columns may include a bit of data from each of the rows of data stored in the memory. The numbers of rows and columns is dependent upon the number of sub-carriers as well as the number of coded bits per single carrier (Nbpscs) for each spatial stream.

FIG. 2A illustrates a table 250 for 1 MHz bandwidth interleaving. The table 250 describes the numbers of rows and columns that may be implemented for interleaving via, e.g., interleaver 209, for the 1 MHz bandwidth channel when 32 sub-carriers are used including 20 data sub-carriers, seven guard sub-carriers, four pilot sub-carriers, and one DC sub-carrier. For instance, the first row of table 250 shows 1*Nbpscs rows by 2 columns. The Nbpscs may equal the number of coded bits per symbol (Ncbps) times the number of data sub-carriers (Nsd), or (Nbpscs=Ncbps*Nsd). The Ncbps may equal Nsd times the modulation order (M), i.e., (Ncbps=Nsd*M), wherein M equals 1 for BPSK, 2 for QPSK, 4 for 16-QAM, 6 for 64 QAM, 8 for 256 QAM, and 10 for 1024 QAM. So the number of rows (Nrows) for 1 MHz bandwidth and BPSK modulation and 20 data sub-carriers in the first row of table 250 is Nrows=1*(20*1)*20, wherein Npscs=400, Ncbps=20, and M=1.

Further entries in table 250 also include 5*Nbpscs rows by 4 columns and 4*Nbpscs rows by 5 columns, which are more square than other entries in the table 250. The actual number of rows can be determined as illustrated in the calculations above for the first row of table 250. FIGS. 2B-D describe alternative embodiments of the interleaving tables 252, 254, and 256 based upon the corresponding OFDM symbols 1062, 1064, and 1066, respectively.

The modulator 210 of transmitter 206 receives data from the interleaver 209. A purpose of modulator 210 is to transform each block of binary data received from encoder 208 into a unique continuous-time waveform that can be transmitted by an antenna upon up-conversion and amplification. The modulator 210 impresses the received data blocks onto a sinusoid of a selected frequency. More specifically, the modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 may be a band pass signal.

In one embodiment, the modulator 210 may implement Quadrature Amplitude Modulation (QAM) impressing two separate k-bit symbols from the information sequence onto two quadrature carriers, $\cos(2\pi ft)$ and $\sin(2\pi ft)$. QAM conveys two digital bit streams, by changing (modulating) the amplitudes of two carrier waves, using the amplitude-shift keying (ASK) digital modulation scheme. The two carrier waves are out of phase with each other by 90° and are thus called quadrature carriers or quadrature components. The modulated waves are summed, and the resulting waveform may be a combination of both phase-shift keying (PSK) and amplitude-shift keying (ASK). A finite number of at least two phases and at least two amplitudes may be used.

In some embodiments, the modulator 210 maps the blocks of data received from encoder 208 uses four points on a constellation, equispaced around a circle, which is referred to as quadrature phase-shift keying (QPSK). With four phases, QPSK can encode two bits per symbol.

In another embodiment, the modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)/n$ for n a positive integer less than or equal to N. A resulting equivalent low pass signal may be represented as $$u(t) = \sum_{n=0}^{\infty} e^{j\theta_n} g(t - nT)$$

where $g(t-nT)$ is a basic pulse whose shape may be optimized to increase the probability of accurate detection at a receiver by, for example, reducing inter-symbol interference. Such embodiments may use Binary Phase-Shift Keying (BPSK), the simplest form of phase-shift keying (PSK). BPSK uses two phases which are separated by 180° and is the most robust of all the PSKs since it takes the highest level of noise or distortion to make the demodulator reach an incorrect decision. In BPSK, there are two states for the signal phase: 0 and 180 degrees. The data is often differentially encoded prior to modulation.

In yet another embodiment, the modulator 210 maps the blocks of data received from encoder 208 alternately on two channels or streams called the I channel (for "in phase") and the Q channel ("phase quadrature"), which is referred to as staggered quadrature phase-shift keying (SQPSK). SQPSK is a method of phase-shift keying in which the signal carrier-wave phase transition is 90 degrees or ¼ cycle at a time. A phase shift of 90 degrees is known as phase quadrature. A single-phase transition does not exceed 90 degrees. In SQPSK, there are four states: 0, +90, −90 and 180 degrees.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. In some embodiments, the OFDM symbols are fed to the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. In the present embodiment, the IDFT may comprise the IFFT module 215, to perform an IFFT on the data. For 1 MHz bandwidth operation, the IFFT module 215 performs a 32-point, inverse FFT on the data streams.

The output of the IFFT module 215 may be up-converted to a higher carrying frequency or may be performed integrally with up-conversion. Shifting the signal to a much higher frequency before transmission enables use of an antenna array of practical dimensions. That is the higher the transmission frequency, the smaller the antenna can be Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \tfrac{1}{2}[\sin(A+B)+\sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The transceiver 200 may also comprise diplexers 216 connected to antenna, array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using printed circuit board metallization technology. Microstrips, striplines, slotlines, and patches, for example, are all candidates for the antenna array 218.

The transceiver 200 may comprise a receiver 204 for receiving, demodulating, and decoding information bearing communication signals. The communication signals may comprise, e.g., 32 tones on a 1 MHz carrier frequency. The 32 tones may comprise 20 data tones, 7 guard tones, 4 pilot tones, and 1 DC tone such as the OFDM packet 1060 illustrated in FIG. 1A. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a CTS or the like. In other embodiments, the sensor may transmit data to the data collection station in response to initiation of communications by the data collection station.

The receiver 204 may comprise one or more of an OFDM module 222, a demodulator 224, a deinterleaver 225, and a decoder 226. The OFDM 222 extracts signal information as OFDM symbols from the plurality of subcarriers onto which information-bearing communication signals are modulated. For instance, the OFDM symbols may comprise data associated with 20 data sub-carriers, four pilot sub-carriers, seven guard sub-carriers, and one DC sub-carrier.

The OFDM module 222 may comprise a fast Fourier transform (FFT) module 219, a DBF module 220, and an STBC module 221. The received signals are fed from antenna elements 218, down-converted to a lower frequency, and are fed to the FFT module 219 to transform the communication signals from the time domain to the frequency domain. The DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, spatial mappers, cyclic shift insertion modules, guard interval insertion modules, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

Figure 3:
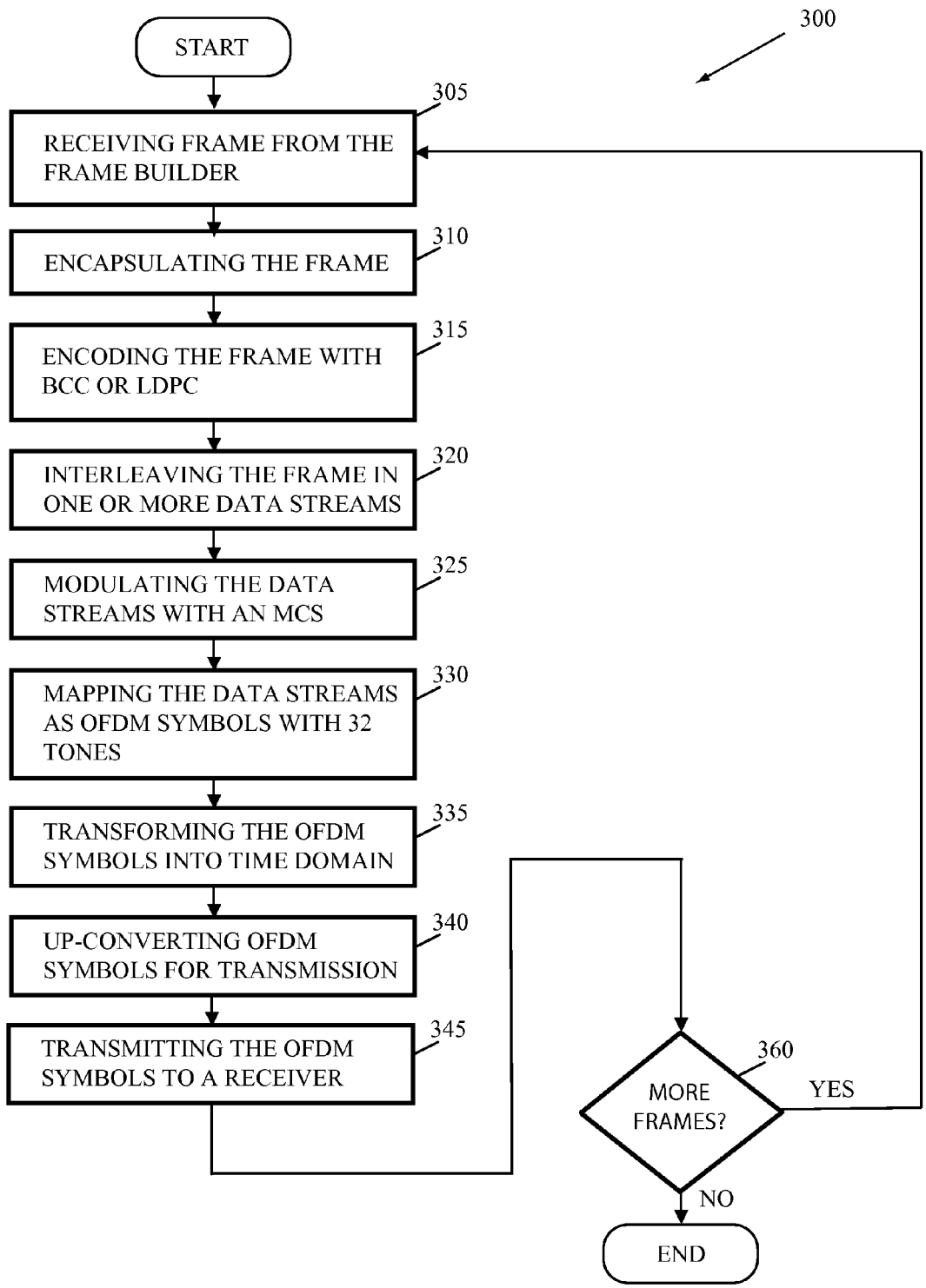
FIG. 3 depicts an embodiment of a flowchart to transmit communications with a transmitter as illustrated in FIG. 2.

FIG. 3 depicts an embodiment of a flowchart to transmit communications with a transmitter as illustrated in FIG. 2. The flowchart 300 begins with receiving a frame from the frame builder (element 305). The MAC sublayer logic may generate a frame to transmit to another communications device and may pass the frame as an MPDU to a data unit builder in the physical layer that transforms the data into a packet that can be transmitted to the other communications device. The data unit builder may generate a preamble to encapsulate the PSDU (the MPDU from the frame builder) to form a PPDU for transmission (element 310). In some embodiments, more than one MPDU may be encapsulated in a PPDU.

The flowchart 300 continues with a transmitter such as transmitter 206 receiving a PPDU from the physical layer logic. The transmitter may encode the PPDU with binary convolutional coding (BCC) or low-density parity check coding (element 315) for controlling errors in the transmission of the data. More specifically, the transmitter may encode the PPDU via one or more encoding schemes described in a preamble of the PPDU such BCC or LDPC.

The transmitter may interleave the frame in one or more data streams (element 320). For example, an interleaver of the transmitter may receive the frame with data in multiple data streams from, e.g., a stream parser. The interleaver may then store the data from the data streams in rows of memory and output the data as data streams from columns of the memory, interleaving the bits of data for transmission.

The transmitter may modulate the data streams via a modulation and coding scheme indicated by the preamble such as BPSK, 16-QAM, 64-QAM, 256-QAM, QPSK, or SQPSK (element 325). For instance, a constellation mapper may map sequences of bits in the data stream to constellation points (complex numbers).

The OFDM module of the transmitter may map the data streams of constellation points as OFDM symbols encoded with, e.g., 32 tones for 1 MHz bandwidth operation to transmit chains (element 330). For example, the OFDM module may comprise an STBC encoder to map the spatial streams of constellation points to space-time streams and a spatial mapper to map the space-time streams to transmit chains as OFDM symbols encoded with the 32 tones such as 20 data tones, seven guard tones, four pilot tones, and one direct current tone. The spatial mapper may provide direct mapping, wherein constellation points from each space-time stream are mapped directly onto the transmit chains (one-to-one mapping). The spatial mapping may provide spatial expansion, wherein vectors of constellation points from all the space-time streams are expanded via matrix multiplication to produce the input of OFDM symbols encoded with 32 tones to all the transmit chains. Or the spatial mapper may provide DBF, wherein each vector of constellation points from all the space-time streams is multiplied by a matrix of steering vectors to produce OFDM symbols encoded with the 32 tones as input to the transmit chains.

The transmitter may transform the OFDM symbols encoded with, e.g., the 32 tones for the 1 MHz bandwidth operation, into the time domain via an inverse Fourier transform such as a 32-point inverse Fourier transform (element 335). Thereafter, the transmitter may up-convert the OFDM symbols for transmission (element 340) and transmit the OFDM symbols as a communication signal to the antenna(s) to transmit the signal to another communications device (element 345). If there are more frames to transmit (element 360), the process may start again at element 305.

Figure 4:
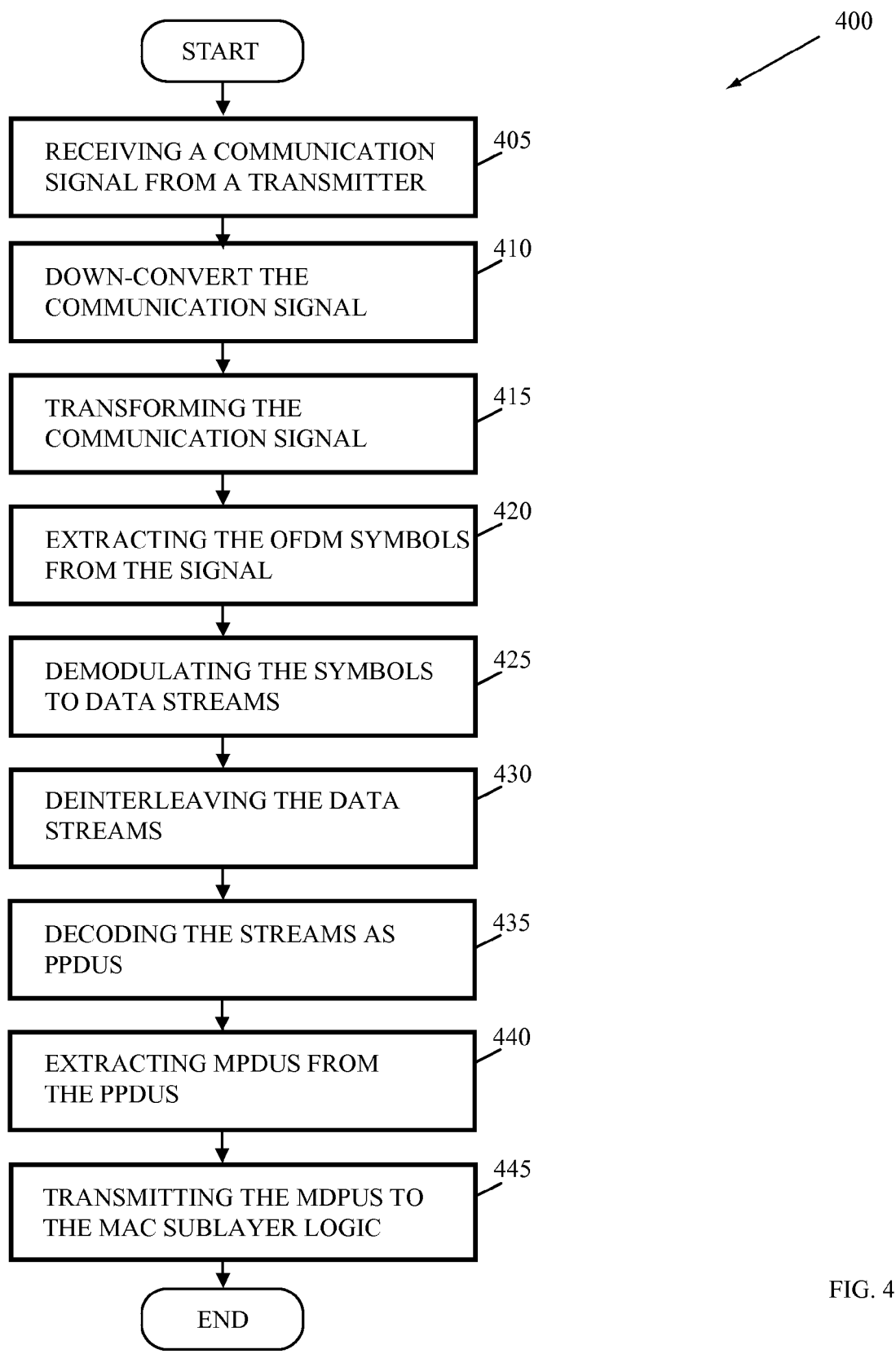
FIG. 4 depicts an embodiment of a flowchart to receive communications with a receiver as illustrated in FIG. 2.

FIG. 4 depicts an embodiment of a flowchart 400 to detect and receive communications with a receiver as illustrated in FIG. 2. The flowchart 400 begins with a receiver such as the receiver 204 detecting and receiving a communication signal from a transmitter via one or more antenna(s) such as an antenna element of antenna array 218 (element 405). The receiver may down-convert the communication signal (element 410) to a lower frequency and transform the communication signal to the frequency domain via, e.g., a 32-point FFT for a 1 MHz bandwidth communication signal (element 415).

The transmitter may extract the OFDM symbols encoded with the 32 tones for a 1 MHz bandwidth channel from the communication signal (element 420) and demodulate the OFDM symbols to produce data streams of demodulated symbols (element 425). For instance, the demodulator such as the demodulator 224 demodulates the signal information via, e.g., BPSK, 16-QAM, 64-QAM, 256-QAM, QSPK, or SQPSK, and outputs the signal as a bit stream to the deinterleaver such as deinterleaver 225 in FIG. 2.

The deinterleaver may deinterleave the bits in the bit stream by storing the bits in, e.g., 5 columns and removing the bits in 4*Nbpscs rows. And the decoder such as the decoder 226 decodes the signal information from the deinterleaver to determine the PPDUs (element 435) via, e.g., BCC or LDPC. The transmitter may then extract the MPDUs from the PPDUs (element 440) and transmit the MPDU to MAC sublayer logic such as MAC sublayer logic 202 (element 445).

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. A method of communicating a communication signal configured to be communicated in a wireless local area (WLAN) network, the method comprising:
    generating, by a transmitter, a plurality of data streams by interleaving eight columns and 3*$N_{BPSCS}$ rows of data bits, wherein $N_{BPSCS}$ denotes a number of coded bits per subcarrier;
    modulating, by the transmitter, the plurality of data streams based upon a modulation and coding scheme;
    mapping, by the transmitter, data of the data streams on transmit chains as orthogonal frequency division multiplexing (OFDM) symbols encoded with a plurality of sub-carriers, the plurality of sub-carriers comprising twenty four data sub-carriers, two pilot sub-carriers, five guard sub-carriers, and one direct current (DC) sub-carrier; and transforming, by the transmitter, the plurality of sub-carriers with the OFDM symbols from a frequency domain into a time domain to create the communication signal.

2. The method of claim 1 comprising up-converting the communication signal to a one megahertz channel.

3. The method of claim 1, wherein modulating the plurality of data streams comprises modulating the plurality of data streams with a modulation format selected from a group consisting of binary quadrature phase-shift keying, 64-point constellation, quadrature amplitude modulation, 256-point constellation, quadrature amplitude modulation, and staggered quadrature phase-shift keying.

4. The method of claim 1, wherein modulating the plurality of data streams comprises modulating the plurality of data streams with a coding rate selected from a group consisting of 1/2, 3/4, 2/3, and 5/6.

5. The method of claim 1, wherein transforming the plurality of sub-carriers comprises performing a 32 point inverse Fourier transform on the plurality of sub-carriers to generate the communication signal.

6. A communication device comprising:
an interleaver comprising logic configured to generate a plurality of data streams by interleaving eight columns and $3*N_{BPCS}$ rows of data bits, wherein $N_{BPSCS}$ denotes a number of coded bits per subcarrier;
a modulator to modulate data of the plurality of data streams based upon a modulation and coding scheme;
an orthogonal frequency division multiplexing (OFDM) module to map the data of the data streams on transmit chains as the OFDM symbols encoded with a plurality of sub-carriers comprising twenty four data sub-carriers, two pilot sub-carriers, five guard sub-carriers, and one direct current (DC) sub-carrier; and
an inverse Fourier transform module to transform the plurality of sub-carriers with the OFDM symbols from a frequency domain into a time domain to create a communication signal.

7. The communication device of claim 6 comprising an up-converter module to up-convert the communication signal to a one megahertz channel.

8. The communication device of claim 6, wherein said interleaver comprises a memory to store the data bits of the data streams in said rows and to output the data bits from the memory in said columns.

9. The communication device of claim 6, wherein the modulator is configured to modulate the data streams with a modulation format selected from a group consisting of binary quadrature phase-shift keying, 64-point constellation, quadrature amplitude modulation, 256-point constellation, quadrature amplitude modulation, and staggered quadrature phase-shift keying.

10. The communication device of claim 6, wherein the modulator is configured to modulate the data streams with a coding rate selected from a group consisting of 1/2, 3/4, 2/3, and 5/6.

11. A method of receiving a communication signal, the method comprising:
transforming, by a receiver, a plurality of sub-carriers with orthogonal frequency division multiplexing (OFDM) symbols from a time domain into a frequency domain to create data streams;
extracting as data, by the receiver, the OFDM symbols encoded with a plurality of sub-carriers comprising twenty four data sub-carriers, two pilot sub-carriers, five guard sub-carriers, and one direct current (DC) sub-carrier;
deinterleaving, by the receiver, a plurality of data streams by storing eight columns and outputting $3*N_{BPSCS}$ rows of data bits, wherein $N_{BPSCS}$ denotes a number of coded bits per subcarrier; and
demodulating, by the receiver, the plurality of data streams based upon a modulation and coding scheme.

12. The method of claim 11 comprising down-converting the communication signal from a one megahertz channel.

13. The method of claim 11, wherein demodulating the data streams comprises demodulating the data streams with a modulation format selected from a group consisting of binary quadrature phase-shift keying, 64-point constellation, quadrature amplitude modulation, 256-point constellation, quadrature amplitude modulation, and staggered quadrature phase-shift keying.

14. The method of claim 11, wherein demodulating the data streams comprises demodulating the data streams with a coding rate selected from a group consisting of 1/2, 3/4, 2/3, and 5/6.

15. The method of claim 11, wherein transforming the plurality of sub-carriers comprises performing a 32 point Fourier transform on the sub-carriers.

16. A wireless communication device to receive a communication signal, the wireless communication device comprising:
a Fourier transform module configured to transform a plurality of sub-carriers with a plurality of orthogonal frequency division multiplexing (OFDM) symbols from a time domain into a frequency domain;
an OFDM module configured to extract a plurality of data streams from the plurality of OFDM symbols encoded with the plurality of sub-carriers comprising twenty four data sub-carriers, two pilot sub-carriers, five guard sub-carriers, and one direct current (DC) sub-carrier;
a deinterleaver to deinterleave the plurality of data streams by storing eight columns and outputting $3*N_{BPSCS}$ rows of data bits, wherein $N_{BPSCS}$ denotes a number of coded bits per subcarrier; and
a demodulator configured to demodulate the plurality of data streams based upon a modulation and coding scheme associated with the plurality of OFDM symbols.

17. The wireless communication device of claim 16 comprising a down-converter module configured to down-convert the communication signal from a one megahertz channel.

18. The wireless communication device of claim 16, wherein the Fourier transform module comprises logic configured to perform a 32 point Fourier transform on the sub-carriers.

* * * * *